PREPARED MOLDED SHOE VAMP

Filed March 25, 1948 5 Sheets-Sheet 1

Inventor
Arthur C. Engel
by David Rines
Attorney

Inventor
Arthur C. Engel
by David Rines
Attorney

PREPARED MOLDED SHOE VAMP

Filed March 25, 1948 5 Sheets-Sheet 3

Inventor
Arthur C. Engel
by David Rines
Attorney

Feb. 7, 1950 A. C. ENGEL 2,496,782
PREPARED MOLDED SHOE VAMP
Filed March 25, 1948 5 Sheets-Sheet 4
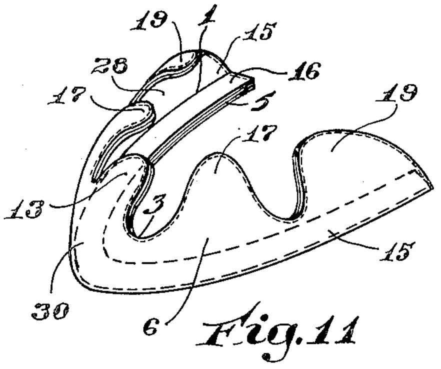
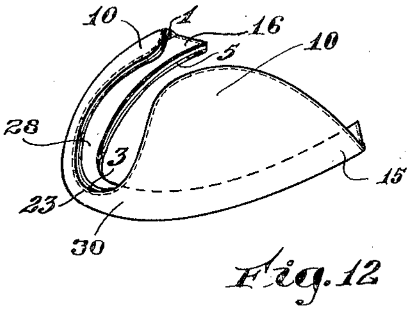
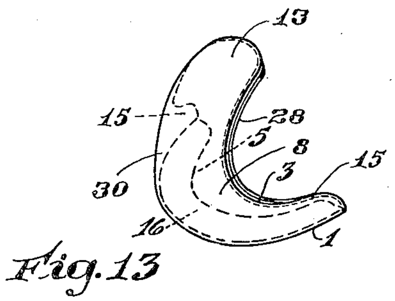
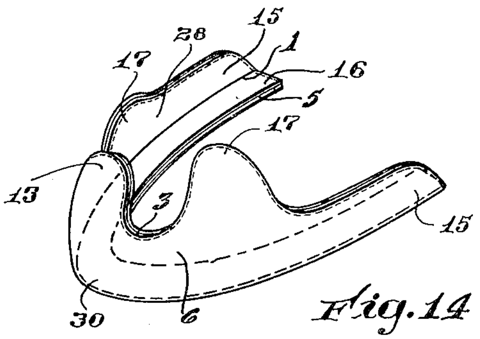
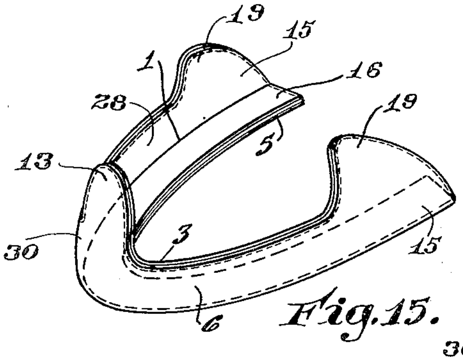
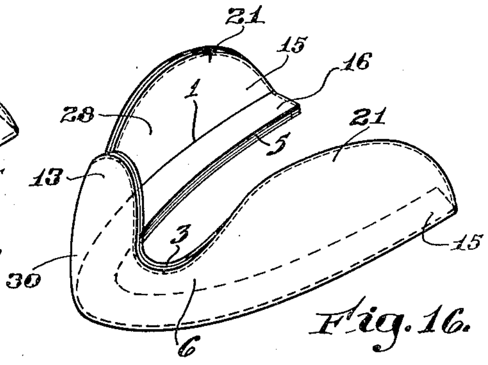
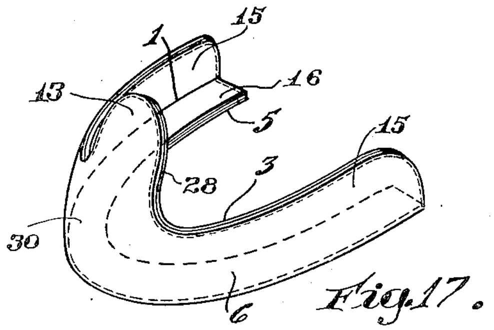
Inventor
Arthur C. Engel
by David Rines
Attorney Feb. 7, 1950 A. C. ENGEL 2,496,782

PREPARED MOLDED SHOE VAMP

Filed March 25, 1948 5 Sheets-Sheet 5

Inventor
Arthur C. Engel
by David Rines
Attorney

Patented Feb. 7, 1950 2,496,782

UNITED STATES PATENT OFFICE 2,496,782

PREPARED MOLDED SHOE VAMP

Arthur C. Engel, Haverhill, Mass.

Application March 25, 1948, Serial No. 16,948

5 Claims. (Cl. 36—46.5)

The present invention relates to prepared molded shoe vamps. A shoe-vamp blank from which the prepared shoe vamp of the present application may be manufactured is disclosed in a divisional application, Serial No. 72,285, filed January 24, 1949.

An object of the present invention is to provide a new and improved prepared molded shoe vamp.

Other and further objects will be explained hereinafter and will be particularly pointed out in the appended claims.

Figures 1, 2:
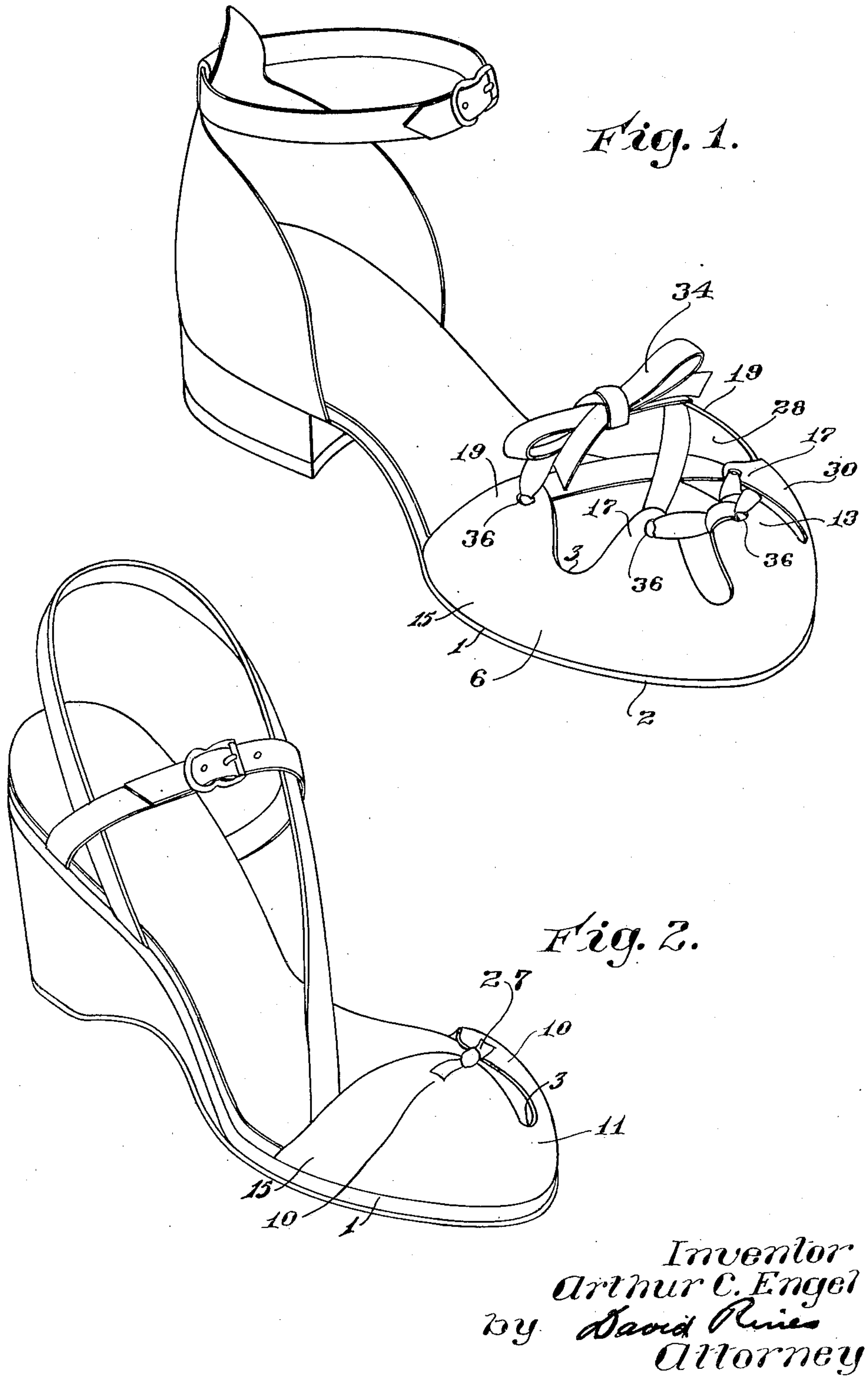
Figure 3:
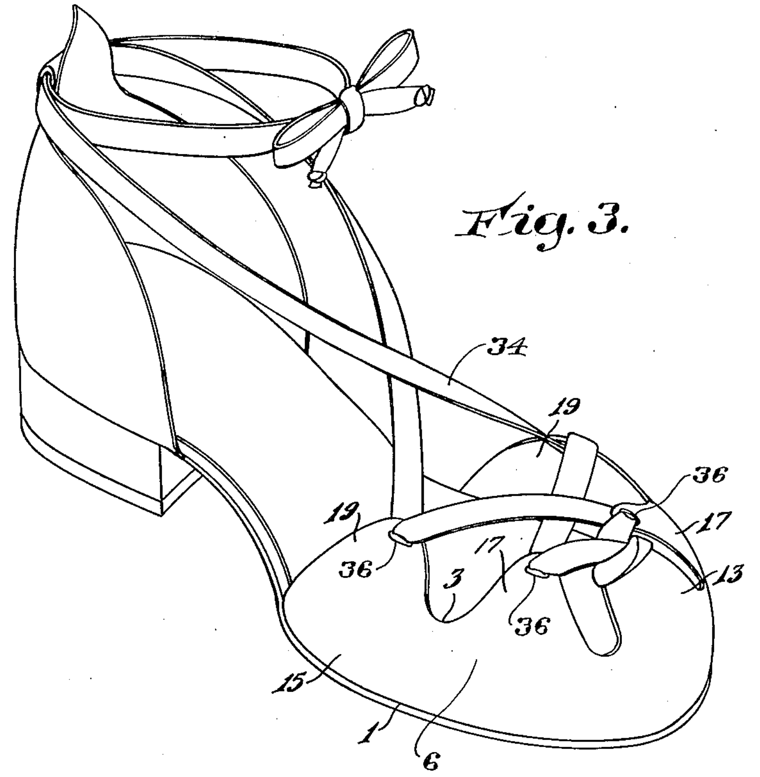
Figure 4:
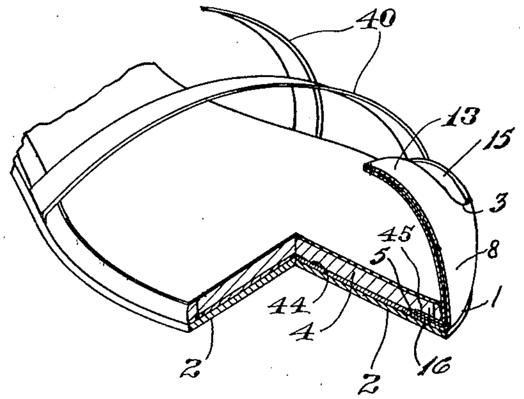
Figure 5:
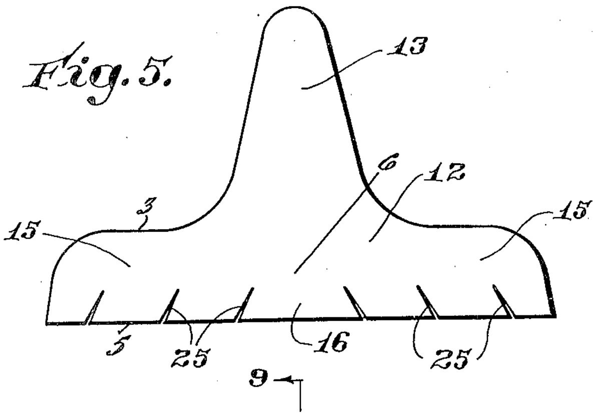
Figure 8:
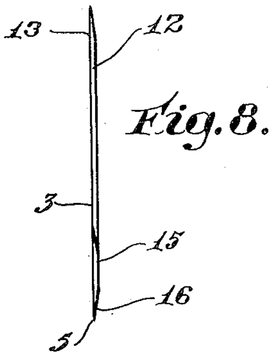
Figure 6:
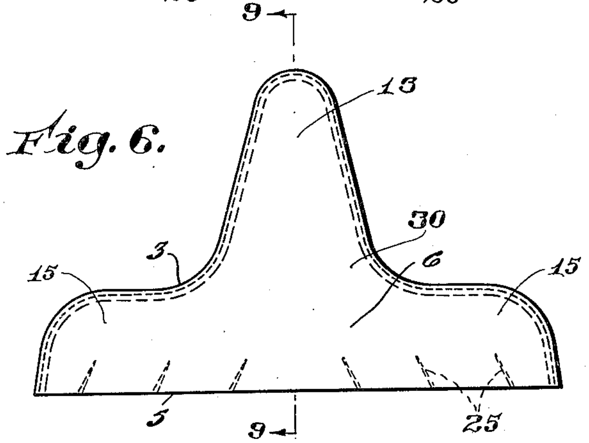
Figure 9:
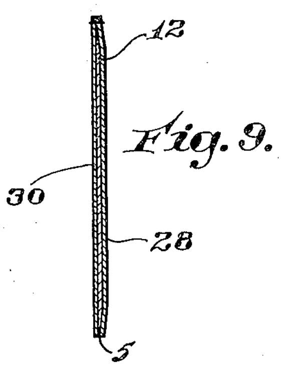
Figure 7:
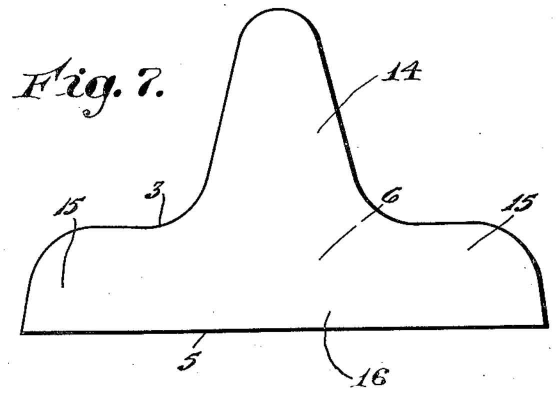
Figure 10:
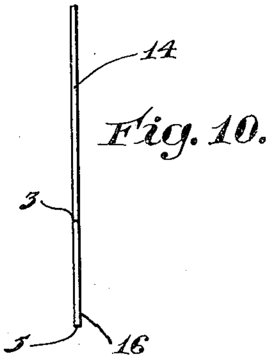
Figure 18:
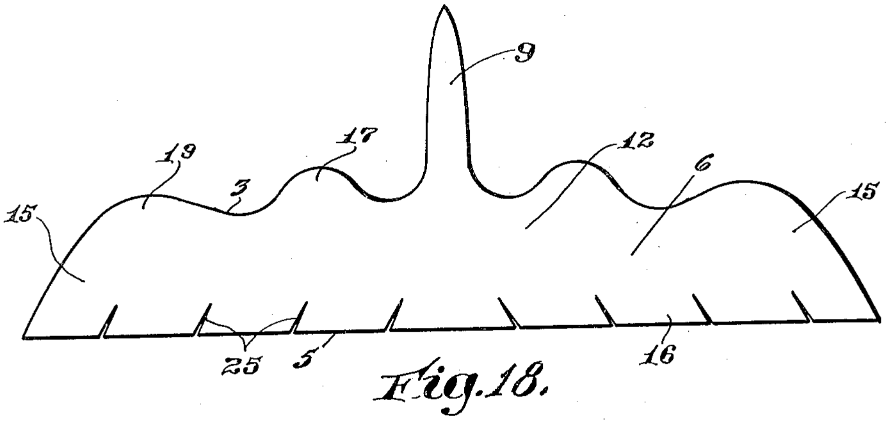
Figure 19:
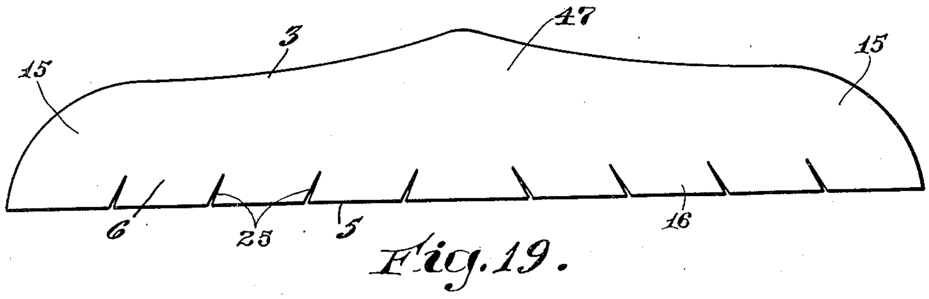
Figure 20:
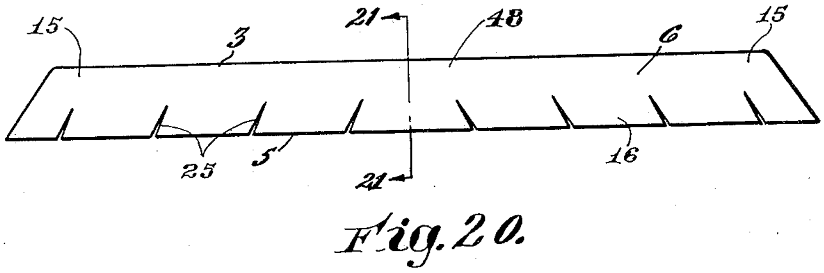
Figure 21:
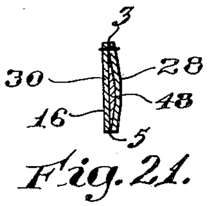

The invention will now be more fully explained in connection with the accompanying drawings, in which Fig. 1 is a perspective of a shoe embodying the invention; Figs. 2 and 3 are similar perspectives of modifications; Fig. 4 is a fragmentary perspective, partly in section, of a further modification; Fig. 5 is an elevation of the stiffener blank out of which may be manufactured the prepared molded shoe vamp shown in Fig. 4; Fig. 6 is a similar elevation showing the stiffener blank of Fig. 5 assembled with an inner lining and an outer leather covering; Fig. 7 is a similar elevation of a similar stiffener blank constituted wholly of leather; Fig. 8 is an elevation of the stiffener blank shown in Fig. 5; Fig. 9 is a vertical section taken upon the line 9—9, Fig. 6, looking in the direction of the arrows; Fig. 10 is an elevation of the leather stiffener blank shown in Fig. 7; Figs. 11 to 17 are perspectives of modified prepared molded shoe vamps embodying the present invention; Figs. 18, 19 and 20 are elevations similar to Figs. 5 and 7 of further modified stiffener blanks; and Fig. 21 is a section similar to Fig. 9 of a vamp embodying the stiffener blank of Fig. 20, the section being taken upon the line 21—21 of Fig. 20, looking in the direction of the arrows.

A prepared molded shoe vamp embodying the present invention is shown in Figs. 1, 3 and 11 provided at its extreme toe portion and on both sides 15 thereof with a portion 6 rising upward a short distance from the outer edge 1 of an inturned bottom flange 16. A tongue 13 rises a substantial distance upward from the upwardly rising portion 6 at its extreme toe portion, and front vamp tongues 17 and rear vamp tongues 19 rise similarly a substantial distance upward from the upwardly rising portion 6 on both sides 15 of the extreme toe portion. This style of prepared shoe vamp may be manufactured from a flat blank 12 having the general shape illustrated, for example, in Fig. 18. The tongue 13 is replaced in Fig. 18, however, by a tongue 9 of more slender shape and longer than the tongue 13, and the portion 6 is shown rising upward a little higher than in Figs. 1, 3 and 11. The toe portion may, on the other hand, be of smaller length, as shown by the blank 47 of Fig. 19, and it may be even smaller still, as shown by the blank 48 of Figs. 20 and 21. The tongue 9 or 13 is shown disposed approximately centrally of this blank 12, and the front vamp tongues 17 and the rear vamp tongues 19 are disposed between the center and the ends of the blank.

Other styles of prepared molded shoe vamps embodying the present invention are illustrated in other figures. The vamp illustrated in Fig. 14, for example, is the same as that shown in Figs. 1, 3 and 11, except that the rear side-portion tongues 19 are omitted. As illustrated in Fig. 15, on the other hand, the front side-portion tongues 17 may be omitted, instead. Both tongues 17 and 19 may be omitted, as shown in Fig. 17. On the other hand, the tongues 17 and 19 may be merged into a single continuous tongue, as illustrated at 21 in Fig. 16.

In the vamp illustrated by Figs. 4 and 13, as a further example, the portion 8 that is shown rising upward a short distance from the outer edge 1 of the inturned bottom flange 16 is not quite so long as the portion 6 of the vamp illustrated in Figs. 1, 3 and 11. The side portions 15 thereof are shown so relatively short as not to be able to provide support for any side-portion tongues 17, 19 or 21. It is therefore provided with only the single tongue 13 rising a substantial distance upward from the upwardly rising portion 8 at its extreme toe portion only. A shoe vamp of this shape may be manufactured from the blank illustrated, for example, in Figs. 5 to 10. In the leather stiffener blank of Figs. 7 and 10, the single tongue at the extreme toe portion is indicated at 14.

In the vamp illustrated in Fig. 2, on the other hand, the portion 11 that is shown rising upward a short distance from the outer edge 1 of the inturned bottom flange 16 is unprovided with any tongue 13 at all at its extreme toe portion. It is provided rather with side-portion tongues 10, rising a substantial distance upward from the upwardly rising portion 11 on both sides of the extreme toe portion of the vamp. A similar construction is illustrated also in Fig. 12, except that the portion 23 of the vamp is shown rising upward a shorter distance from the outer edge 1 of the inturned bottom flange 16 than is the case with the upwardly rising portions 6, 8 and 11. It has already been stated, in connection with the blank 12 of Fig. 18, on the other hand, that the upwardly rising portion of the vamp may rise higher than is illustrated by the portions 6, 8 and 11, and this is illustrated also by the blank 47 of Fig. 19.

In all cases, however, the upwardly rising portions of the shoe vamp are separated at their upper edges in order to provide an opening at the top of the shoe vamp. The width of the vamp, at some approximately central point thereof, is in all cases small compared with its length, in order that this vamp opening shall extend from near the extreme toe portion of the shoe vamp rearward throughout the length of the vamp. The tongues, such as are indicated at 9, 10, 13, 14, 17, 19 and 21, for example, project into this opening. A portion of the vamp formed from the blank 48 of Figs. 20 and 21 may similarly rise upward to form a tongue portion in this opening.

The blank out of which the vamp of the present invention is manufactured may comprise a stiffener blank died or otherwise formed out of suitable sheet material. Several such blanks are illustrated in Figs. 5 to 10 and 18 to 21. The sheet material may be constituted of composition, such as leatherboard, fiberboard or other vegetable-pulp product impregnated with sizing treated with wax or a similar substance. The margin of the stiffener blank may be skived, as illustrated in Figs. 8, 9 and 21. The skiving is not, however, essential, and the leather stiffener blank of Figs. 7 and 10 is therefore shown unskived.

The flat stiffener blank may be secured in place between a flat inner lining 28 and a flat outer cover 30 assembled therewith. The resulting shoe-vamp blank thus produced becomes provided with upper and lower edges 3 and 5, the lower edge 5 defining the inner edge of the inturned bottom flange 16 of the molded vamp. Each of these three component blanks extends upward from its lower edge 5 to provide the completed shoe-vamp blank with a tongue-carrying portion corresponding to the upwardly rising portions 6, 8, 11 or 23 of the prepared molded vamp. This tongue-carrying portion is provided with the side parts 15 and a centrally disposed part corresponding to the extreme toe portion of the vamp. The toe-portion tongue 9, 13 or 14 is shown supported by the centrally disposed part of the tongue-carrying portion at a substantial distance from the ends of the blank. The width between the upper and lower blank edges 3 and 5 of the tongue-carrying portion, at the sides of the tongue 9, 13 or 14, near the centrally disposed part of the tongue-carrying portion, is small compared with the length of the blank between its ends, in order that the upwardly rising portion 6, 8, 11 or 23 of the vamp near the extreme toe portion shall be short, thereby to provide the molded vamp with the previously described opening extending from near the extreme toe portion rearward throughout the length of the vamp.

The assembled shoe-vamp blank or the leather stiffener blank of Figs. 7 and 10 is molded into finished shoe-vamp shape in any desired manner, and it may also be wiped to form the inturned bottom flange 16, as is well known in the art. The inturned bottom flange 16 may be slashed, as shown at 25, prior to the molding and wiping operations.

The vamp is then ready for assembly in a shoe. In Fig. 4, as an illustration, it is shown assembled by securing the inturned bottom flange 16 between the outer sole 2 and the inner sole 4 at the toe portion and on both sides of the shoe by means of staples 45. No lasting operation is at all required during this assembly, though a last may be employed as a support for nailing or cementing.

Through elimination of the lasting process, the manufacture of the shoe is simplified and speeded up, and its cost is greatly lessened. Further economy is obtained by reason of the fact that small pieces of scrap leather, that otherwise would be sacrificed, may be employed for the leather covering 30. The cost of labor is also greatly reduced because, since it is not necessary to use box toes in the manufacture of the shoe, it is possible to do away also with the box-toe-assembly operations.

A further advantage of the present invention is that it is not necessary to manufacture shoes embodying the prepared molded shoe vamp in so many sizes and shapes as has heretofore been the practice; for any shoe embodying the invention will fit many feet of varying size and shape. All that is necessary, in order to adapt the shoe to the particular size and shape of the foot to be fitted, is to adjust the sides of the vamp of the shoe slightly closer together or to spread them slightly further apart to vary the opening at the top of the vamp. In the case of shoes that are unprovided with long side portions, but that embody the toe portions only of the shoe-upper vamp, it is not necessary to make even this slight adjustment.

Following the adjustment, the sides of the vamp may be held together in place on the foot by laces, latches, eyelets, ringlets and the like. In Figs. 1 and 3, for example, a shoe lace 34 is illustrated as threaded through eyelets 36 in the toe-portion tongue 13 and the side-portion vamp tongues 17 and 19. These eyelets 36, if employed may be provided either before or after the molding operation. The shoe lace 34 may be tensioned or tightened in varying degrees so as to cause the toe-portion tongue 13 and the side-portion vamp tongues 17 and 19 to bind against the foot with suitable pressure, after which the shoe lace 34 may be tied into a knot, as illustrated in Fig. 1, or it may be carried back of the ankle, as illustrated in Fig. 3, or it may be fastened in any other desired way. In order to facilitate the adjustment, the toe-portion tongue 13 and the side-portion vamp tongues 17 and 19 of the stiffener blank may, instead of rising coextensively with the inner lining and the outer covering, be wholly omitted, as illustrated in Figs. 19 to 21, though without omitting the corresponding toe-portion tongue and side-portion vamp tongues of the inner lining 28 and the outer leather covering 30. As the inner lining 28 and the outer covering 30 become thus provided with portions extending above the upper edge of the blank stiffener, these portions become enabled to flex more easily, without being impeded by the stiff blank stiffener. Something of the same effect is obtained by suitably skiving the upper edge of the blank stiffener, as this reduces the stiffness along its upper margin. The shoe lace 34, may, however, be replaced by a simple bow as illustrated at 27 in Fig. 2. Neither shoe lace 34 nor bow 2 is entirely necessary, however, for the shoe may be held in place on the foot by straps 40, as illustrated in Fig. 4, or in any other desired way.

Further modifications will occur to persons skilled in the art, and all such are considered to fall within the spirit and scope of the invention, as defined in the appended claims.

What is claimed is:

1. A prepared shoe vamp for assembly in a shoe comprising an inner lining, an outer covering and a stiffener inserted between the inner lining and the outer covering, the inner lining, the stiffener and the outer covering being molded to finished shoe-vamp shape and having an inturned bottom flange adapted to be secured between the inner sole and the outer sole of a shoe and a portion rising upward a short distance from the outer edge of the flange at its extreme toe portion and on both sides thereof, said rising portion being provided with tongues rising a substantial distance upward therefrom and being separated at their upper edges in order to provide an opening at the top of the shoe vamp that extends from near the extreme toe portion of the shoe vamp rearward throughout the length of the shoe vamp.

2. A prepared shoe vamp for assembly in a shoe comprising an inner lining, an outer covering and a stiffener inserted between the inner lining and the outer covering, the inner lining, the stiffener and the outer covering being molded to finished shoe-vamp shape and having an inturned bottom flange adapted to be secured between the inner sole and the outer sole of a shoe and a portion rising upward a short distance from the outer edge of the flange at its extreme toe portion and on both sides thereof, the inner lining, the outer covering and the stiffener rising a substantial distance upward from the said rising portion to form tongues separated at their upper edges in order to provide an opening at the top of the shoe vamp that extends from near the extreme toe portion of the shoe vamp rearward throughout the length of the shoe vamp.

3. A prepared shoe vamp for assembly in a shoe comprising an inner lining, an outer covering and a stiffener inserted between the inner lining and the outer covering, the inner lining, the stiffener and the outer covering being molded to finished shoe-vamp shape and having an inturned bottom flange adapted to be secured between the inner sole and the outer sole of a shoe and a portion rising upward a short distance from the outer edge of the flange at its extreme toe portion and on both sides thereof, the inner lining and the outer covering rising a substantial distance upward from the said rising portion above the upper edge of the stiffener to form tongues separated at their upper edges in order to provide an opening at the top of the shoe vamp that extends from near the extreme toe portion of the shoe vamp rearward throughout the length of the shoe vamp.

4. A prepared shoe vamp for assembly in a shoe comprising an inner lining, an outer covering and a stiffener inserted between the inner lining and the outer covering, the inner lining, the stiffener and the outer covering being molded to finished shoe-vamp shape and having an inturned bottom flange adapted to be secured between the inner sole and the outer sole of a shoe and a portion rising upward a short distance from the outer edge of the flange at its extreme toe portion and on both sides thereof, said rising portion being provided with tongues rising a substantial distance upward therefrom and being separated at their upper edges in order to provide an opening at the top of the shoe vamp that extends from near the extreme toe portion of the shoe vamp rearward throughout the length of the shoe vamp, said tongues having means for receiving means for placing the tongues under varying degrees of tension in order to vary the vamp opening.

5. A prepared shoe vamp for assembly in a shoe comprising an inner lining, an outer covering and a stiffener inserted between the inner lining and the outer covering, the inner lining, the stiffener and the outer covering being molded to finished shoe-vamp shape and having an inturned bottom flange adapted to be secured between the inner sole and the outer sole of a shoe and a portion rising upward a short distance from the outer edge of the flange at its extreme toe portion and on both sides thereof, the inner lining, the outer covering and the stiffener coextensively rising a substantial distance upward from the said rising portion to form one or more tongues thereby to provide an opening at the top of the shoe vamp that extends from near the extreme toe portion of the shoe vamp rearward throughout the length of the shoe vamp.

ARTHUR C. ENGEL.

REFERENCES CITED

The following references are of record in the file of this patent:

UNITED STATES PATENTS

| Number | Name | Date |
|---|---|---|
| Re. 6,123 | Stockwell | Nov. 3, 1874 |
| D. 27,361 | Waters | July 13, 1897 |
| D. 80,632 | Perugia | Mar. 4, 1930 |
| D. 101,907 | Weisman | Nov. 10, 1936 |
| D. 107,808 | Troy | Jan. 4, 1938 |
| 237,887 | McCaffrey | Feb. 15, 1881 |
| 241,423 | Rogers | May 10, 1881 |
| 900,881 | Parker | Oct. 13, 1908 |
| 1,386,684 | Bradford | Aug. 9, 1921 |
| 1,514,634 | Seely | Nov. 11, 1924 |
| 1,536,204 | Gawronski | May 5, 1925 |
| 1,734,531 | Ryan | Nov. 5, 1929 |
| 2,015,090 | Sawyer | Sept. 24, 1935 |
| 2,071,775 | Winnett | Feb. 23, 1937 |
| 2,119,274 | Hurtwell | May 31, 1938 |
| 2,151,554 | Josephson | Mar. 21, 1939 |
| 2,239,206 | Tietig | Apr. 22, 1941 |
| 2,245,466 | Dawes | June 10, 1941 |
| 2,327,322 | Slater | Aug. 17, 1943 |
| 2,330,273 | Finn | Sept. 28, 1943 |

FOREIGN PATENTS

| Number | Country | Date |
|---|---|---|
| 22,421 | Great Britain | Nov. 2, 1905 |
| 308,964 | Germany | Nov. 8, 1918 |